United States Patent [19]

Tate et al.

[11] Patent Number: 4,742,151

[45] Date of Patent: May 3, 1988

[54] ULTRA-HIGH-MOLECULAR-WEIGHT POLYESTERS

[75] Inventors: Susumu Tate, Shiga; Haruhiko Narusawa; Youichi Watanabe, both of Otsu; Akira Chiba, Kobe, all of Japan

[73] Assignee: Toyo Boseki Kabushiki Kaisha, Osaka, Japan

[21] Appl. No.: 42,625

[22] Filed: Apr. 23, 1987

Related U.S. Application Data

[63] Continuation of Ser. No. 878,712, Jun. 26, 1986, abandoned.

[51] Int. Cl.[4] .............................................. C08G 63/02
[52] U.S. Cl. ................................ 528/272; 528/308.1; 528/308.2; 528/497; 528/498
[58] Field of Search .................. 528/272, 308.1, 308.2, 528/497, 498

[56] References Cited

U.S. PATENT DOCUMENTS 4,230,818 10/1980 Broughton et al. ................ 528/272
4,613,664 9/1986 Tate et al. ........................... 528/274
4,634,761 1/1987 Mendiratta et al. ................ 528/500

FOREIGN PATENT DOCUMENTS 1645605 6/1970 Fed. Rep. of Germany .

Primary Examiner—Lucille M. Phynes

[57] ABSTRACT

A novel ultra-high-molecular-weight polyester prepared from aromatic dicarboxylic acid or alkyl ester thereof and alkylene glycol, and having intrinsic viscosity of not less than 1.5 and insoluble polymer content of not more than 10% by weight.

7 Claims, No Drawings

ULTRA-HIGH-MOLECULAR-WEIGHT POLYESTERS

This application is a continuation of application Ser. No. 878,712 filed June 26, 1986, now abandoned.

FIELD OF THE INVENTION

The present invention relates to ultra-high-molecular-weight polyesters. More particularly, the ultra-high-molecular-weight polyesters of the present invention have intrinsic viscosity of not less than 1.5 and good solubility.

BACKGROUND OF THE INVENTION

A polyester is generally produced by direct esterification of an aromatic dicarboxylic acid and glycol, or by ester exchange reaction of an alkyl ester of aromatic dicarboxylic acid and glycol to give a glycol ester and/or an oligomer followed by heating them with stirring under high vacuum to effect polycondensation.

U.S. Pat. No. 2,597,643 discloses that polymerization of polyester can be carried out in a solvent. In such reaction, the polymerization is, however, carried out in a solution which can completely dissolve a resulting polyester, and hence, the resulting polyester has a very low intrinsic viscosity of 0.4–0.7.

There has been widely and industrially used a process wherein polycondensation is carried out by heating and stirring under a high vacuum. This process, however, requires certain vacuum apparatus to keep high vacuum and high power for stirring of material having high viscosity.

Further, since materials for industry use, such as a tire cord and the like, require higher physical properties, there is used a polyester having a high molecular weight. However, it is difficult to stir such a polyester having a higher molecular weight, and hence, a polymer obtained by melt polycondensation is generally subjected to further solid phase polymerization under vacuum or an inert gas flow for a long term of time. In the latter process, however, a polyester having intrinsic viscosity of, at most, 1.0 to 1.5 is usually prepared. In addition, it is difficult to completely dissolve the resulting polyester in a solvent.

On the other hand, it has been reported that a polymer is pulverized in fine powder and subjected to solid phase polymerization to obtain a polyester having a molecular weight of about 120,000 (Cryogenic Properties of Polymers, 249, Dekker). However, in this case, it has been also reported that the resulting polyester is partially insoluble in a solvent used for measuring viscosity, and it is assumed that the molecular weight of the polyester is apparently increased due to a crosslinking reaction.

OBJECTS AND SUMMARY OF THE INVENTION

In order to obtain a polyester having a high molecular weight as well as good solubility, the present inventors have intensively studied. As the result, it has been found that a novel ultra-high-molecular-weight polyester can be obtained by polycondensation in a specific heating medium disclosed in our U.S. patent application Ser. No. 813,460 filed Dec. 26, 1985 now U.S. Pat. No. 4,613,664 granted Sept. 23, 1986.

The main object of the present invention to provide a novel ultra-high-molecular-weight polyester having high intrinsic viscosity and good solubility.

This and other objects and advantages of the present invention will be apparent to skilled persons in the art from the following description.

According to the present invention, there is provided an ultra-high-molecular-weight polyester prepared from aromatic dicarboxylic acid or alkyl ester thereof and alkylene glycol, and having intrinsic viscosity of not less than 1.5 and insoluble polymer content of not more than 10% by weight, said insoluble polymer content being measured by dissolving 6 g of said polyester in 100 ml of the mixed solvent of trifluoroacetic acid/dichloroethane (1/1) at 25° C. with stirring at 150 to 200 r.p.m. for 6 hours, filtering an insoluble material with a glass filter having opening size of 20 to 30$\mu$ under reduced pressure, washing the insoluble material with chloroform, drying at 130° C. for 24 hours in vacuo, weighing the resulting insoluble material and calculating the weight % of the insoluble material based on 6 g of the polyester.

DETAILED DESCRIPTION OF THE INVENTION

Aromatic dicarboxylic acid or alkyl ester thereof used in the present invention includes dicarboxylic acid having two carboxylic groups directly connected to a benzene or naphthalene ring such as terephthalic acid, isophthalic 2,6- naphthalenedicarboxylic acid and sodium 5-sulfoisophthalate, p-$\beta$-oxyethoxybenzoic acid, 4,4'-dicarboxyldiphenyl, 4,4'-dicarboxylbenzophenone, bis(4-carboxylphenyl)ethane, or alkyl esters thereof such as methyl, ethyl and propyl ester.

The alkylene glycol used in the present invention includes alkylene glycols having 2 to 6 carbon atoms such as ethylene glycol, propylene glycol, butane diol and neopentyl glycol, diethylene glycol, cyclohexane dimethanol, ethylene oxide adduct of bisphenol A.

The intrinsic viscosity of the polyester of the present invention is not less than 1.5, preferably, 1.5 to 10.0, more preferably, 1.5 to 8.0. The intrinsic viscosity in the present invention is determined according to the following method.

The intrinsic viscosity was measured with a mixture of p-chlorophenol (PCP)/tetrachloroethane (TCE) (3/1) at 30° C., and the resulting value was converted to the viscosity in phenol/tetrachloroethane (6/4) using the following formula :

$$[\eta]60/40 \text{ phenol/TCE} = 0.8352[\eta]3/1 \text{PCP/TCE} + 0.005$$

The term "ultra-high-molecular-weight" used herein means a molecular weight of the polyester of not less than about 70,000. Usually, the polyester of the present invention having the above intrinsic viscosity has a molecular weight of about 70,000 to 1,000,000.

The insoluble polymer content of the polyester of the present invention is not more than 10% by weight, usually, 10 to 0 % by weight. As described above, the term "insoluble polymer content" means the value measured by dissolving 6 g of said polyester in 100 ml of the mixed solvent of trifluoroacetic acid/dichloroethane (1/1) at 25° C. with stirring at 150 to 200 r.p.m. for 6 hours, filtering an insoluble material with a glass filter having opening size of 20 to 30$\mu$ under reduced pressure, washing the insoluble material with chloroform, drying at 130° C. for 24 hours in vacuo, weighing the resulting insoluble material and calculating the weight % of the insoluble material based on 6 g of the polyester.

The ultra-high-molecular-weight polyester of the present invention can be prepared by the process disclosed in the above our U.S. patent application Ser. No. 813,460 now U.S. Pat. No. 4,613,664 granted Sept. 23, 1986.

That is, firstly, aromatic dicarboxylic acid or alkyl ester thereof and alkylene glycol are subjected to esterification or ester exchange reaction according to a conventional method to give an oligomer. That is, there is carried out the esterification of aromatic dicarboxylic acid with alkylene glycol, or ester exchange reaction of alkyl ester of aromatic dicarboxylic acid with alkylene glycol. Then, the oligomer or the oligomer condensed in the earlier stage is heated and stirred with a heating medium in an amount of 1 to 100 times, preferably, 2 to 50 times as much as the amount of the oligomer in the presence of a known polycondensation catalyst at about 200°-300° C., preferably at 220°-280° C. for about 1-20 hours under ambient, reduced or certain pressure to give the desired ultra-high-molecular-weight polyester of the present invention. By the way, by-product glycol, which is transferred into the heating medium, can be removed with an inert gas by blowing the inert gas (e.g. nitrogen, carbon dioxide, helium, argon and the like) into the reaction system, or by replacing the said heating medium by a fresh one. The oligomer or polymer in the heating medium is subjected to polycondensation reaction in a melting state or a solid state due to a heating temperature.

Alternatively, the polyester of the present invention can be produced by the following process.

A polyester having intrinsic viscosity of 0.5 to 0.7 is prepared by carrying out the esterification or ester exchange reaction of the above aromatic dicarboxylic acid or alkyl ester thereof and alkylene glycol according to a conventional method to give oligomer, and then either subjecting the oligomer to a conventional melt polycondensation under a high vacuum, or to polycondensation in the above heating medium. The resulting polyester having intrinsic viscosity of 0.5 to 0.7 is formed into a chip and charged into a solid polymerization tank. Then, in the polymerization tank, the resulting polyester chip and the heating medium are heated with stirring under ambient, reduced or certain pressure, at about 150°-250° C., preferably at 220°-240° C. for about 1-20 hours to give the desired ultra-high-molecular-weight polyester.

The heating medium used in these processes is a heat-stable organic compound which can be used as a liquid within a range of the reaction temperature, and there is exemplified aromatic hydrocarbons, aliphatic hydrocarbons, alicyclic hydrocarbons and aromatic ethers. Suitable examples of such heating medium used in the present invention are heating mediums which can swell polyesters and can not dissolve polyesters, or one or more than two kinds of the compounds having the following general formula (I) or (II):

$$A^1-A^2--A^k \quad (I)$$

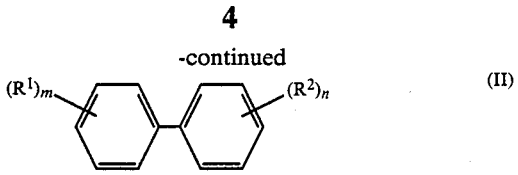

(wherein $A^1$ and $A^k$ are phenyl or $C_{5\text{-}20}$ cycloalkyl; $A^2$ to $A^{k\text{-}1}$ are, respectively, phenylene or $C_{5\text{-}20}$ cycloalkylene; $R^1$ and $R^2$ are $C_{1\text{-}20}$ alkyl; k is integer of 2-5; and m and n are integer of 0-5, provided that $n+m \geq 1$). Examples of the compounds of the formulas (I) and (II) include triethyl biphenyl, diethylbiphenyl, dimethylbiphenyl, trimethylbiphenyl, tetraethyl biphenyl, tripropyl biphenyl, cyclohexyl benzene, hydrogenated triphenyl, hydrogenated tetraphenyl and the like. The heating medium can be purified prior to use by a known method, such as distillation.

As the polycondensation catalyst, there can be used a known catalyst in the production of a polyester such as antimony, titanium, cobalt, manganese, germanium, tungsten and tin compound. A particularly preferred used in the present invention includes tungsten or tin compound, which is compatible to polyester, such as tungstic acid or a salt thereof, stannous acetate, stannous bromide, stannic bromide, stannous chloride, stannic chloride and the like.

It is assumed that the heating medium has the following properties. That is, the polycondensation reaction is equilibrated with a by-product glycol, and hence, a high-molecular-weight polymer can not be obtained unless the by-product glycol is expelled from the polymerization system. It is believed that the heating medium partly impregnates into the polymer and swells it to remove the by-product glycol from the polymer, resulting in facilitating the polycondensation reaction.

It is unknown why the polyester of the present invention can be readily dissolved in a solvent, while it has a very high viscosity.

The following Examples, Comparative Examples and Reference Examples further illustrate the present invention in detail but are not to be construed to limit the scope thereof.

EXAMPLE 1

Into a 500 ml reactor, equipped with a stirrer, an inert gas inlet, a waste gas outlet, and a bottom discharge opening, were charged an oligomer directly obtained from esterification of terephthalic acid and ethylene glycol (containing 0.05 mol % (as tungsten) of tungstic acid as a polymerization catalyst based on an acid component and an intrinsic viscosity of 0.35) (5 g), and hydrogenated triphenyl (250 ml) as a heating medium. Then, the mixture was heated with stirring at 250° C. under 2.0 L/min. of nitrogen flow. A waste gas, a part of the heating medium and a by-product ethylene glycol were discharged vra a discharge opening, while a fresh heating medium was added to keep the constant liquid level. At 4 and 6 hours after beginning of the reaction, entire heating medium was changed to a fresh medium, respectively. At 8 hours after beginning of the reaction, the obtained polyethylene terephthalate was removed, washed thoroughly with acetone and dried. The resulting polyester was white and had the intrinsic viscosity of 2.3. The insoluble polymer content was 0% by weight.

Then the build-up polymer on the inside wall of the reactor was dissolved in 200 ml of m-cresol, which was reprecipitated with methanol, washed and dried to give polyester having the intrinsic viscosity of 2.3.

EXAMPLE 2

The same procedure of Example 1 was repeated except that triethyl biphenyl was used as a heating medium. After 8 hours of the reaction, the intrinsic viscosity of the polymer was 2.0. The insoluble polymer content was 0% by weight.

EXAMPLE 3

Into the same reactor as in Example 1 were charged polyester chips, which were directly obtained from esterification of terephthalic acid and ethylene glycol followed by the conventional melt polymerization (containing 0.05 mol % of antimony as a polymerization catalyst and having an intrinsic viscosity of 0.60) (50 g), and hydrogenated triphenyl (250 ml) as a heating medium. The mixture was heated with stirring under a nitrogen flow at 2.0 L/min while the temperature was gradually raised up and kept at 230° C.

On raising temperature, the polyester chips began to crystallize and were whitened at about 150° C. And a waste gas, a part of the heating medium and a by-product glycol were removed via the discharge opening, while a fresh heating medium was added to keep the constant liquid level.

After 8 hours, polyethylene terephthalate was removed, washed thoroughly with acetone and dried. The resulting polyester was white and had the intrinsic viscosity of 1.66. The insoluble polymer content was 0% by weight.

COMPARATIVE EXAMPLE 1

There was carried out crystallization treatment at 150° C. using the same polyester chips in Example 3. The above polyester chips (50 g) were charged in a glass tube under dry nitrogen flow at 2.0 L/min at 230° C.

After 8 hours, the polyester was removed and the intrinsic viscosity thereof measured in the same manner as described in Example 1 was 0.90. The resulting polyester was colored in pale yellow.

EXAMPLE 4

In the same manner as described in Example 3, except that polyester chips containing 0.05 mol % of tungsten was used instead of that containing antimony, a polyester having an intrinsic viscosity of 1.92 was obtained after 20 hours. The insoluble polymer content was 0% by weight.

EXAMPLE 5

Into a 300 ml separable reactor, equipped with a stirrer having a turbine impeller, a thermometer, a solvent and inert gas inlet and a gas outlet, were charged the same oligomer described in Example 1 containing tungsten (5 g), and hydrogenated triphenyl (200 ml), and the mixture was reacted with vigorous stirring at 240° C. During the reaction, heated nitrogen gas was supplied at 2.0 L/min and a fresh solvent was added to keep the constant liquid level. After 8 hours, the mixture was cooled and the polymer was removed, washed thoroughly with acetone and dried. The resulting polyester had the intrinsic viscosity of 3.03. The insoluble polymer content was 0% by weight.

EXAMPLE 6

In the same manner as described in Example 5, except that an oligomer containing 0.05 mol % (as tin) of stannous actate based on the acid component and having an intrinsic viscosity of 0.34 (5 g) was used, a polyester having an intrinsic viscosity of 3.02 was obtained. The insoluble polymer content was 0% by weight.

EXAMPLE 7

The same manner as described in Example 5 was repeated except that a reactor were charged with the same oligomer described in Example 6 (50 g) and a heating medium, hydrogenated triphenyl (250 ml), and the mixture was gradually heated to 237° C. and maintained at this temperature for 12 hours to carry out polycondensation. The resulting polyester has the intrinsic viscosity of 3.03. The insoluble polymer content was 0% by weight.

EXAMPLE 8

In the same manner as described in Example 7, except that the same oligomer described in Example 1 (50 g) was used, a polyester having an intrinsic viscosity of 2.56 was obtained. The insoluble polymer content was 0% by weight.

EXAMPLE 9

In the same manner as described in Example 7 except that triethyl biphenyl was used as a heating medium, a polyester having an intrinsic viscosity of 2.79 was obtained. The insoluble polymer content was 0% by weight.

COMPARATIVE EXAMPLE 2

In the same manner as described in Example 3, polyester chips obtained by the conventional melt polymerization (containing 0.05 mol % of antimony as a polymerization catalyst and having an intrinsic viscosity of 0.615) were crushed into a particle size of about 1.4 to 2.4 mm, and heated with stirring at a temperature of 215° C. under the reduced pressure (0.1 torr). After 170 hours, there was obtained a polyester having an intrinsic viscosity of only 1.59. The insoluble polymer content was as much as 11.5% by weight.

REFERENCE EXAMPLES 1 to 5

The ultra-high-molecular-weight polyethylene terephthalates of the present invention shown in Table 1 (Reference Examples 1 to 3) and conventional polyethylene terephthalates (Reference Examples 4 and 5) were dissolved into trifluoroacetic acid/dichloroethane (1/1), and the each resulting mixtures was subjected to solvent casting method to give a film having a thickness of about 40$\mu$. The resulting films were stretched as far as about 80% of the maximum draw ratio in silicone oil at a temperature of 150° C., and then subjected to heat setting at a temperature of 220 ° C. for one minute. The breaking strength of the stretched film was measured by a tensilometer. The results are shown in Table 1. The above maximum draw ratio was evaluated by stretching a test piece (1 cm×3 cm) of an unstretched film in silicone oil (150° C.).

TABLE 1

|  | Intrinsic Viscosity | Maximum Draw Ratio (times) | Strength at Break (kg/mm$^2$) |
| --- | --- | --- | --- |
| Ref. Ex. 1 | 3.27 | 11.7 | 62 |
| Ref. Ex. 2 | 2.43 | 10.8 | 51 |
| Ref. Ex. 3 | 2.05 | 9.6 | 46 |
| Ref. Ex. 4 | 1.24 | 7.5 | 34 |
| Ref. Ex. 5 | 0.60 | 5.5 | 18 |

ADVANTAGE OF THE INVENTION

The present ultra-high-molecular-weight polyethylene terephthalate provides various advantages in the following applications:

(1) The present polyethylene terephthalate provides high properties and high functions for applications in industrial materials such as a tire code, a film and the like.

(2) The present polyethylene terephthalate can be used as a fiber and other articles having a high strength and high properties.

(3) The present polyethylene terephthalate can be molded by solution molding method because of a good solubility.

Further, the present polyethylene terephthalate will have various immeasurable applications in future.

What is claimed is:

1. An ultra-high-molecular-weight polyester prepared from aromatic dicarboxylic acid or alkyl ester thereof and alkylene glycol, and having intrinsic viscosity of not less than 1.5 and insoluble polymer content of not more than 10% by weight, said insoluble polymer content being measured by dissolving 6 g of said polyester in 100 ml of the mixed solvent of trifluoroacetic acid/dichloroethane (1/1) at 25° C. with stirring at 150 to 200 r.p.m. for 6 hours, filtering an insoluble material with a glass filter having opening size of 20 to 30μ under reduced pressure, washing the insoluble material with chloroform, drying at 130° C. for 24 hours in vacuo, weighing the resulting insoluble material and calculating the weight % of the insoluble material based on 6 g of the polyester.

2. An ultra-high-molecular-weight polyester according to claim 1, which has intrinsic viscosity of not less than 2.0.

3. An ultra-high-molecular-weight polyester according to claim 1, which has intrinsic viscosity of not less than 2.5.

4. An ultra-high-molecular-weight polyester according to claim 1, which has intrinsic viscosity of not less than 3.0.

5. An ultra-high-molecular-weight polyester according to claim 1, which has insoluble polymer content of not more than 5.0% by weight.

6. An ultra-high-molecular-weight polyester according to claim 1, wherein aromatic dicarboxylic acid is terephthalic acid.

7. An ultra-high-molecular-weight polyester according to claim 1, wherein alkylene glycol is ethylene glycol.

* * * * *

UNITED STATES PATENT AND TRADEMARK OFFICE
CERTIFICATE OF CORRECTION

PATENT NO. : 4,742,151

DATED : May 3, 1988

INVENTOR(S) : Susumu Tate et al

It is certified that error appears in the above-identified patent and that said Letters Patent is hereby corrected as shown below:

The following should additionally be listed as references cited under U.S. PATENT DOCUMENTS on the cover page:

| | | | |
|---|---|---|---|
| 2,742,452 | 4/1956 | Heisenberg et al | 528/308.4 |
| 3,329,653 | 7/1967 | Bevers et al | 528/176 |
| 3,489,720 | 1/1970 | Price et al | 528/277 |
| 3,523,923 | 8/1970 | Smith et al | 528/274 |
| 3,716,523 | 2/1973 | Cook | 528/283 |

The following should additionally be listed as references cited under FOREIGN PATENT DOCUMENTS on the cover page:

| | | |
|---|---|---|
| 1105314 | 11/1955 | France |
| 2180115 | 11/1973 | France |
| 1015393 | 12/1965 | United Kingdom |
| 1430012 | 3/1976 | United Kingdom |

Signed and Sealed this

Twenty-third Day of August, 1988

Attest:

DONALD J. QUIGG

*Attesting Officer*    *Commissioner of Patents and Trademarks*